United States Patent [19]
Harrison et al.

[11] Patent Number: 5,961,333
[45] Date of Patent: *Oct. 5, 1999

[54] EDUCATIONAL AND TRAINING DEVICES AND METHODS

[76] Inventors: Robert G. Harrison, 2120 - 8th Ave. N., #102; Robert D. Lamson, 2611 Eastlake Ave. E. #405, both of Seattle, Wash. 98102

[*] Notice: This patent is subject to a terminal disclaimer.

[21] Appl. No.: 08/707,623

[22] Filed: Sep. 5, 1996

[51] Int. Cl.[6] .............................. G09B 3/00; G09B 5/00; G09B 7/00

[52] U.S. Cl. ................ 434/322; 434/307 A; 434/307 R; 434/308; 434/318; 434/323; 434/327; 434/335; 434/351; 434/362

[58] Field of Search .............................. 434/307 R, 308, 434/309, 317, 318, 322, 323, 327, 335, 339, 351, 362, 307 A

[56] References Cited

U.S. PATENT DOCUMENTS

| | | | |
|---|---|---|---|
| H1452 | 6/1995 | Kennedy | 434/322 |
| 4,639,225 | 1/1987 | Washizuka | 434/308 |
| 4,804,328 | 2/1989 | Barrabee | 434/308 |
| 5,120,230 | 6/1992 | Clark et al. | 434/307 R |
| 5,267,865 | 12/1993 | Lee et al. | 434/350 |
| 5,395,243 | 3/1995 | Lubin et al. | 434/118 |
| 5,421,730 | 6/1995 | Lasker, III et al. | 434/118 |

*Primary Examiner*—Kien T. Nguyen
*Assistant Examiner*—John Edmund Rovnak
*Attorney, Agent, or Firm*—Richard D. Multer

[57] ABSTRACT

User-actuated systems for retrieving and presenting information on a particular subject and/or information employable in a learn while doing mode on the performance of a specified task. The systems include a laser-readable, encoded, data storage device; a player for retrieving data from the storage device; and a screen on which the retrieved information can be displayed. Onboard controls allow the system user to reach the information of concern, to repeat the presentation of that information, and to otherwise navigate through the available choices in a fashion which best meets his or her needs. An optional remote control allows the system user to accomplish the same functions, while being freed from the location of the system module.

28 Claims, 6 Drawing Sheets

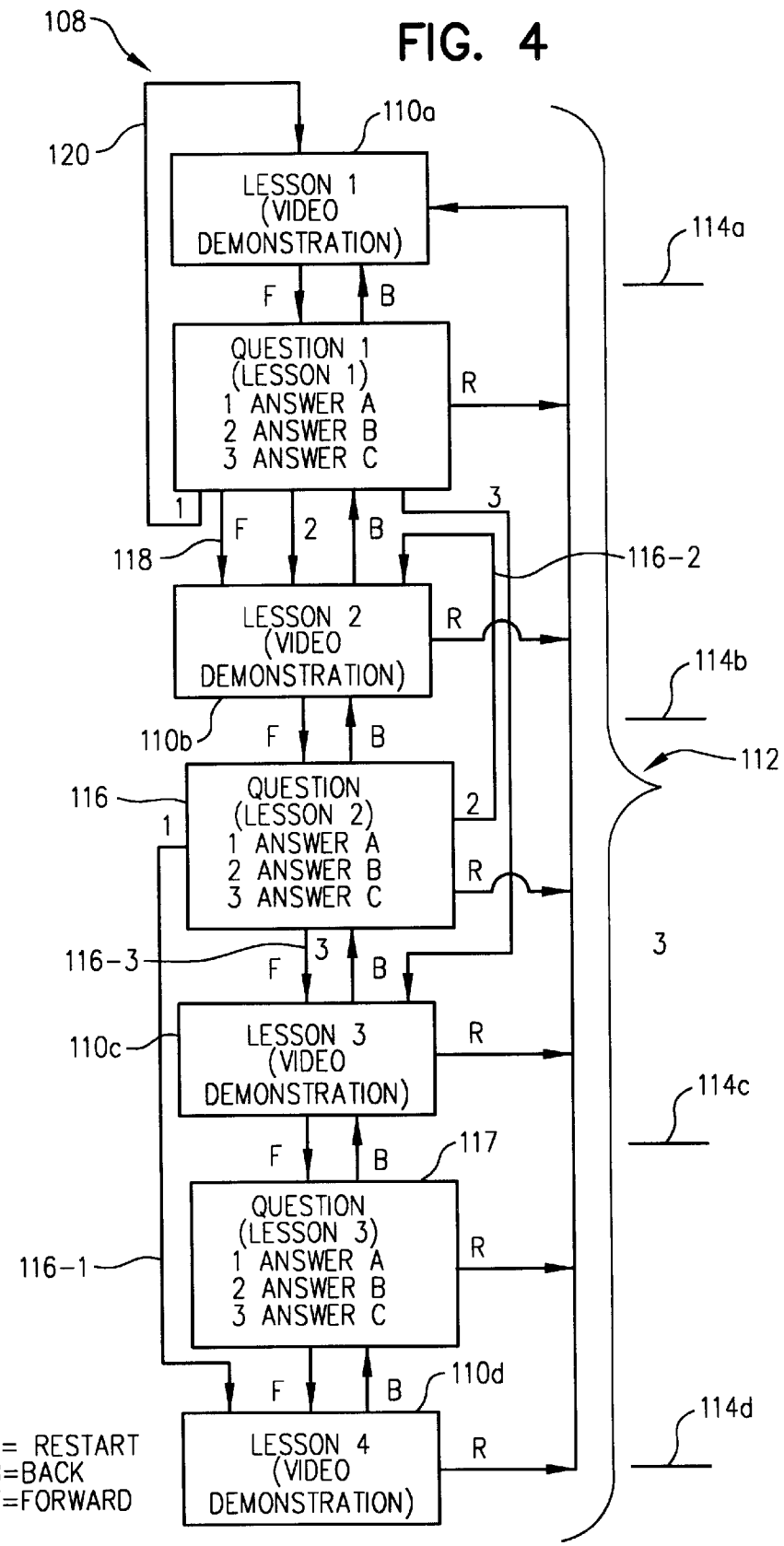

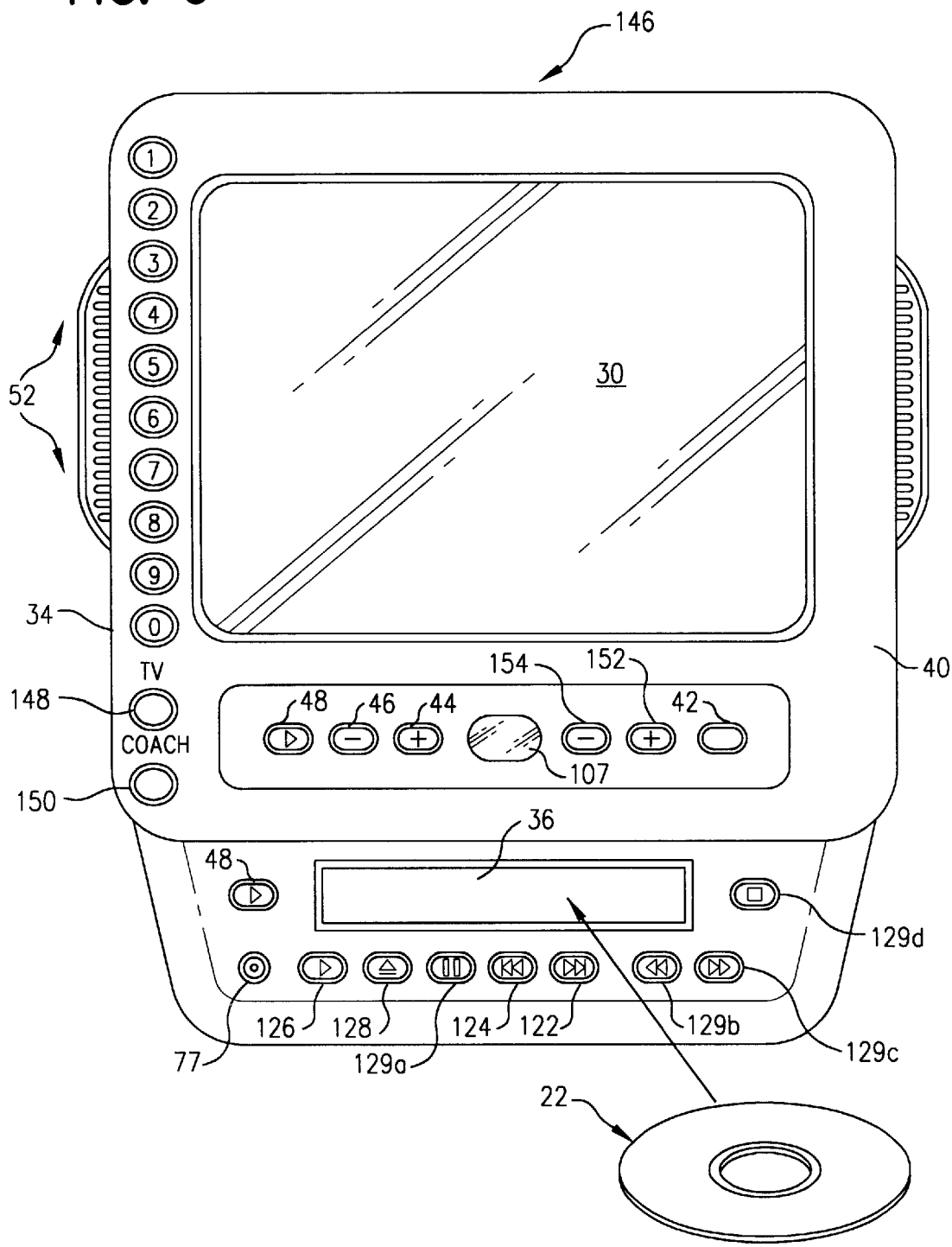

EDUCATIONAL AND TRAINING DEVICES AND METHODS

TECHNICAL FIELD OF THE INVENTION

The present invention relates to novel improved systems and methods which employ a learn while doing approach for educational purposes and for training persons to perform an essentially unlimited variety of tasks.

BACKGROUND OF THE INVENTION

Heretofore proposed have been information retrieval and display systems which include an integrated module having: (a) a player for a laser readable, encoded data storage device such as a video compact disc, an audio compact disc, a laser disc, or one of the soon to be available digital video discs; (b) a player for retrieving data from the disc; and (c) a screen on which the retrieved information can be displayed.

Stored on the laser readable disc is data constituting a hierarchy of user-retrievable, multiple choice menus and, for each of the choices in the lowest level menu employed in navigating a particular course through the hierarchy, instructions or other information sought by the user. The selected information can be displayed statically on the screen of the system or presented as a video for visual and audible reception, often as a demonstration of a technique for performing a particular task or a step of that task.

An instruction set also stored in digital form on the encoded data storage device is so constructed that the user can easily reach the information relating to the performance of a particular step, repeat the presentation of that information, advance sequentially through the steps of the task, skip steps, return directly to an introductory video or the first step of the task, and otherwise navigate through the available choices in a fashion which best meets his or her needs.

The heretofore proposed systems can be readily converted from use in one environment to use in another environment. All this requires is a disc or other information storage device coded with information appropriate for the alternate purpose. Similarly, added information storage modules can be supplied to increase the amount of information available on a particular subject. The use of easily loaded and replaced information storage devices such as inexpensively supplied video compact discs also makes it very practical to combine easily accessed and almost immediately accessible information in different categories which may be useful to one in a particular setting.

A remote control is employed to access the highest (top) level menu in the hierarchial array. Once the highest level menu is reached, the user is instructed to navigate through the menu hierarchy by using numbered—①through ⑨—buttons on the remote control to, beginning with the top level menu, select one of the menus available on each successively lower level and to make a choice of the items of information available from the lowest level menu in a particular set of menus. Choices of lower level menus and of items of information are numbered so that the user can make a choice by pressing the correspondingly numbered button.

An introductory video allows a new user to easily use the system to access selected information on the very first try without training or guidance from another person and without consulting written instructions. For many, the elimination of the need to refer to written instructions is of paramount importance as they consider any more than the most rudimentary written instructions distasteful, if not something to be avoided at all costs.

SUMMARY OF THE INVENTION

There have now been invented, and disclosed herein, certain new and novel systems which have the characteristics and attributes of those described above and, in addition, certain novel, innovative features which make the systems disclosed herein particularly advantageous in applications where the objective is to teach the system user a selected subject or to train that person to perform a specified task.

One of the significant features of the present invention, important from at least manufacturing and cost viewpoints, is a simplified construction in which components required to provide the entertainment capabilities of the previously disclosed systems—e.g., television channel selection and signal receiving and processing circuitry as well as mode switching circuitry—are eliminated.

Another important feature of the present invention is the provision of data storage discs so encoded as to: (a) query the system user on information that has been presented to the user, and (b) return or advance the user to a location in the instructional sequence which is appropriate, depending upon whether the user's response to the query is correct or incorrect.

Still another important feature of the present invention is the provision of integrated module onboard controls which eliminate the need for a remote control. It is common, in training and educational settings, for remote controls to be misplaced or to otherwise not be available when needed. The provision of the onboard controls conveniently and inexpensively eliminates this problem.

Yet another significant practical feature of the present invention is the inclusion of an earphone jack in the integrated module. This is of self-evident importance for applications of the invention in which multiple systems are in concurrent use in the same locale.

Notwithstanding the foregoing, provision may be made for the user to operate the integrated unit with a remote control. This has the advantage of freeing the system user from the location of the integrated unit as the user works his or her way through an instructional sequence. That may be significant in applications of the invention in which the user is required to move about and perform physical steps of a task as the instructional scenario is played out. A remote control can also be advantageous in other applications where the system user is required or chooses to be at more than arms length from the integrated unit.

Aside from the foregoing, the novel systems of the present invention have the advantages of being rugged, easy to clean, and portable and of being readily mountable in a wall, cabinet, or comparable supporting structure.

Another important attribute of the present invention is that the advantages discussed above are obtained without sacrificing any of those features of the heretofore proposed systems which are significant in teaching and training environments—for example, ease of use without prior instruction and the ability to switch from one subject to another simply by substitution of an appropriately encoded disc.

Other objects, advantages, and features of the invention will be apparent to the reader from the foregoing and the appended claims and as the ensuing detailed description and discussion of the invention proceeds in conjunction with the accompanying drawings.

BRIEF DESCRIPTION OF THE DRAWINGS

FIG. 4 shows, diagrammatically, a representative navigation chart which can be navigated by a user of the FIG. 1 system to access information on a subject of interest and/or instructions on performing a specified task;

FIG. 6 is a front view of a second type of module or integrated unit for the FIG. 1 system.

DETAILED DESCRIPTION OF THE INVENTION

Figure 1:
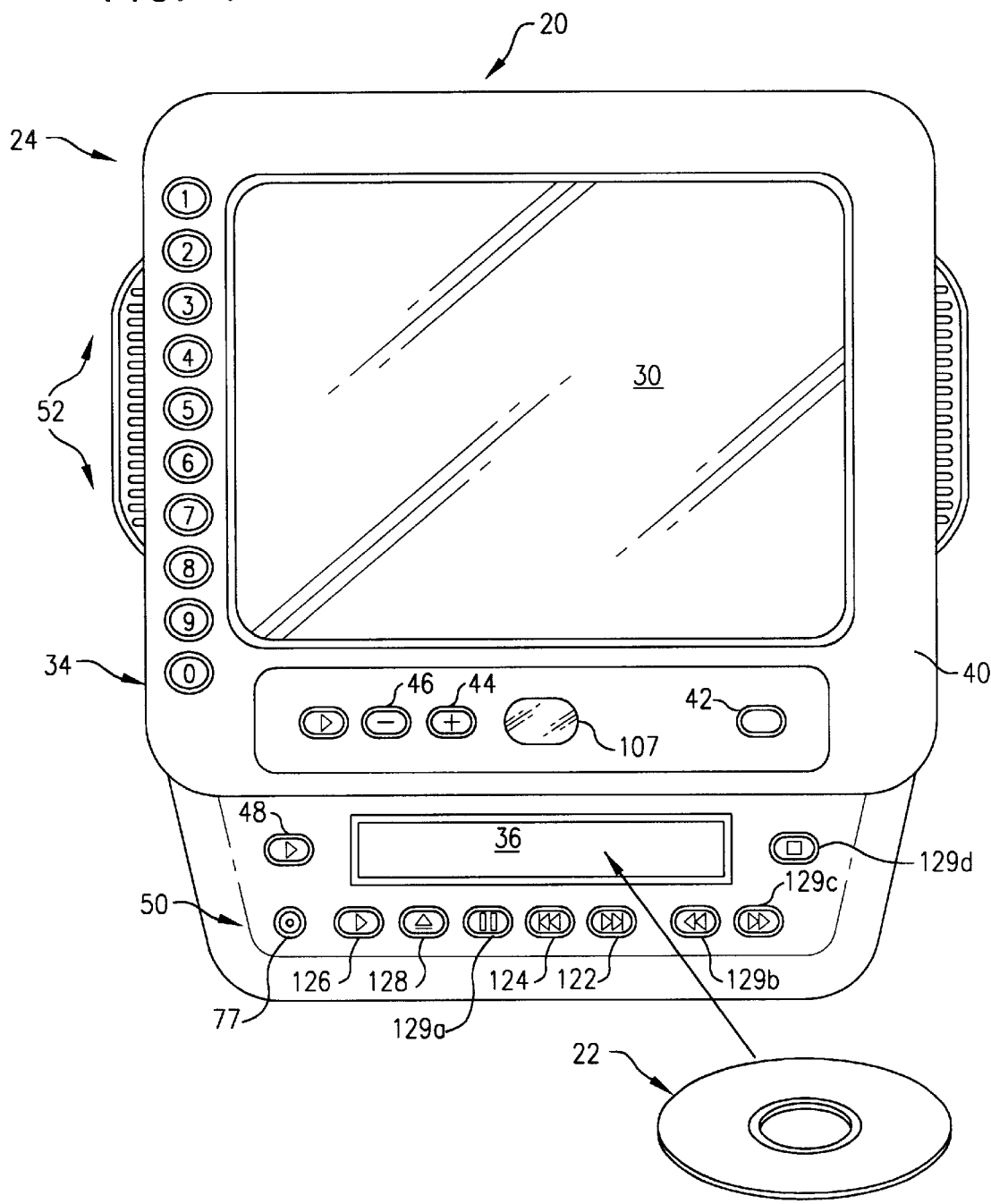
FIG. 1 depicts, pictorially, a teaching and training system embodying the principles of the present invention.

Referring now to the drawings, FIG. 1 depicts a system 20 which embodies the principles of the present invention and can be employed in a learn while doing mode of operation to teach a selected subject to a system user and/or to instruct the user on the performance of a specified task. The major components of system 20 are a laser readable disc 22 for storing information in a user retrievable format; an integrated unit (or module) 24; and an optional remote control 26.

Integrated unit 24 includes a CRT (cathode ray tube) 28 with a screen 30 and a video compact disc player 32, both housed in the same cabinet 34. A conventional loader such tray 36 is used to load a disc 22 into player 32.

Controls for operating system 20 are located on the front panel 40 of cabinet 34. These controls are: an on-off switch 42, volume up and down buttons 44 and 46, and a mute button 48, which turns the sound off. Also accessible from front panel 40 of module cabinet 34 are: a complement 50 of conventional controls for disc player 32 and a numerical keypad 52 with membrane switches ①  . . . ⑨ which are employed by the system user in a learning or learn while doing mode of operation to retrieve information from disc 22 and to check the correctness of his or her answers to questions posed to the user as lessons or segments of information are retrieved from the disc.

Portability is provided by the integration of CRT 28 and disc player 22 into a single module. This integration also makes system 20 user friendly by eliminating the external cables that would otherwise be required as well as the onerous and technical task of hooking up the components. Instead, all that is necessary is to locate integrated unit 24 in an appropriate place and plug its external power cord (not shown) into an electrical outlet.

As mentioned above, video compact discs are the currently preferred data storage media as they are easily handled and stored, yet have enough data storage capacity to make available an adequate number of dynamic, visual/ audio presentations of information. Also, compact discs are durable and impervious to contamination and rough handling. Nevertheless, it is not essential that this particular type of information storage device be employed. Alternatives include: (a) laser discs which, while perhaps more cumbersome, have the advantage of holding more information than many other types of data storage devices; and (b) audio compact discs, which can be employed in circumstances in which there is nothing to be gained by a visual presentation of information. Also, in the future, DVD's (digital versatile discs) may become the storage media of choice.

Figure 2:
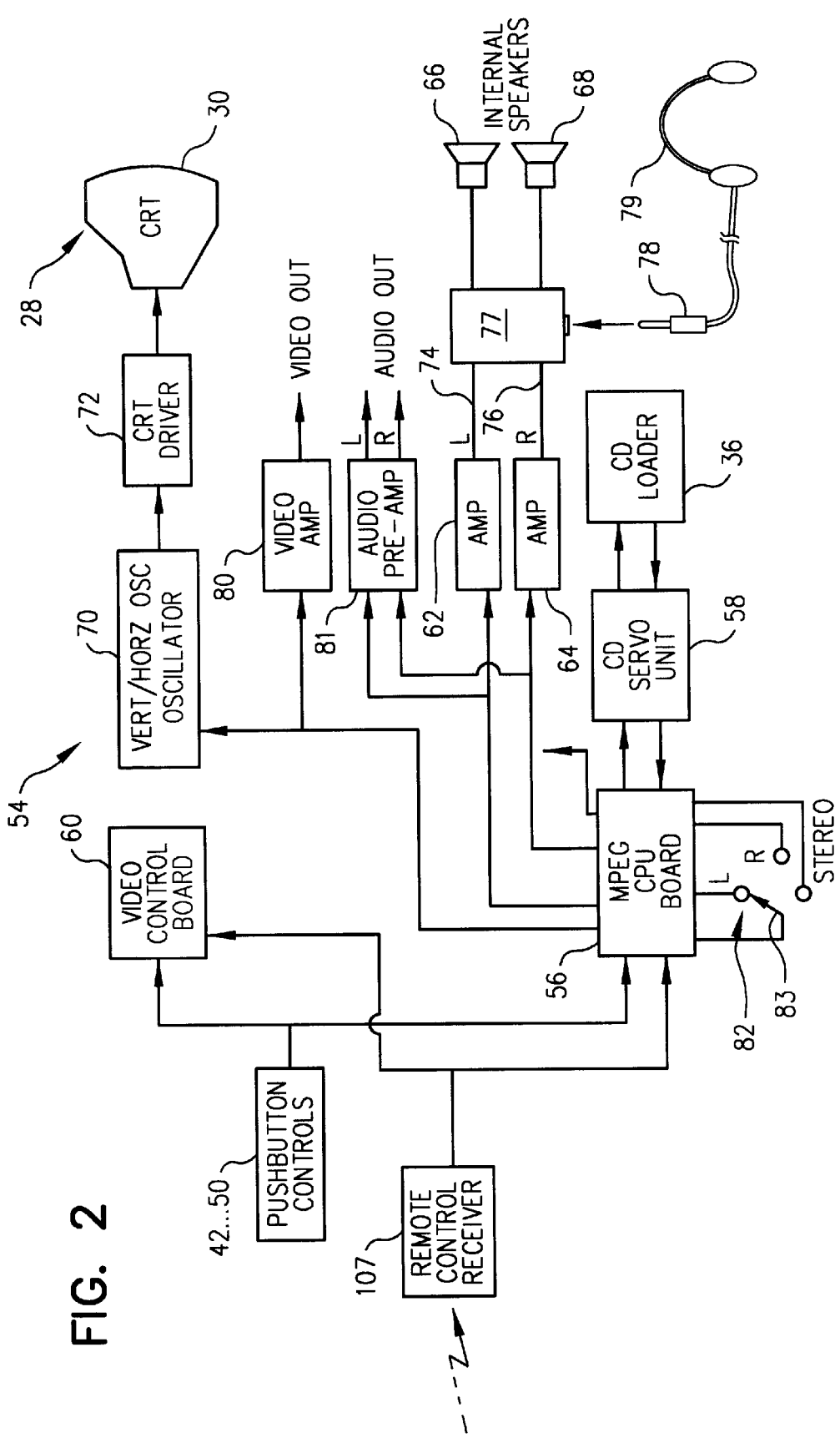
FIG. 2 shows, in schematic form, the operating components of the FIG. 1 system.

The internal operating components of integrated unit 24 are depicted schematically in FIG. 2 and collectively identified by reference character 54. These components include an MPEG CPU board 56 which controls the operation of a CD servo unit 58. The servo unit reads data from a disc 22 in disc player 32 and sends that data to the MPEG CPU board. Here, the retrieved data is decompressed and converted to analog video and audio signals. The latter are respectively routed to video control board 60 and to left and right channel audio amplifiers 62 and 64. Amplifiers 62 and 64 drive speakers 66 and 68 which are integral components of module 24 and housed within the cabinet 34 of that module.

Video control board 60 routes the decompressed video signal to a board 70 with conventional vertical and horizontal oscillators. The output from board 70 is routed to a driver 72 for CRT 28.

Optionally, but preferably, connected in parallel with left and right channel speakers 66 and 68 are the inputs 74 and 76 to a conventional female receptacle 77 for a headphone jack 78 wired to headphones 79. The conventional switch (not shown) in receptacle 77 interrupts the transmission of audio signals to internal speakers 66 and 68 when jack 78 is inserted in receptacle 77. This allows the user of system 20 to listen to an audio component of information retrieved from disc 22 in privacy when multiple systems 20 are being employed in a common setting and the audio from the several modules might lead to confusion or distraction. Headphones can also be used in any other circumstance in which limiting the transmission of the audio content to a single or very limited number of persons may be advantageous.

Reference characters 80 and 81 respectively identify a video amplifier for an optional external video monitor and an audio pre-amp for optional external speakers. The operation of the integrated unit components just described is controlled by the controls 42 . . . 0L on the front panel 40 of integrated unit 24. The operation of those system components may also be controlled by duplicate controls on remote control 26.

Also numbered among the operating controls of integrated unit 24 is the three-position switch 82 illustrated in FIG. 2. The three positions of that switch are identified as L, R, and STEREO.

Figure 3:
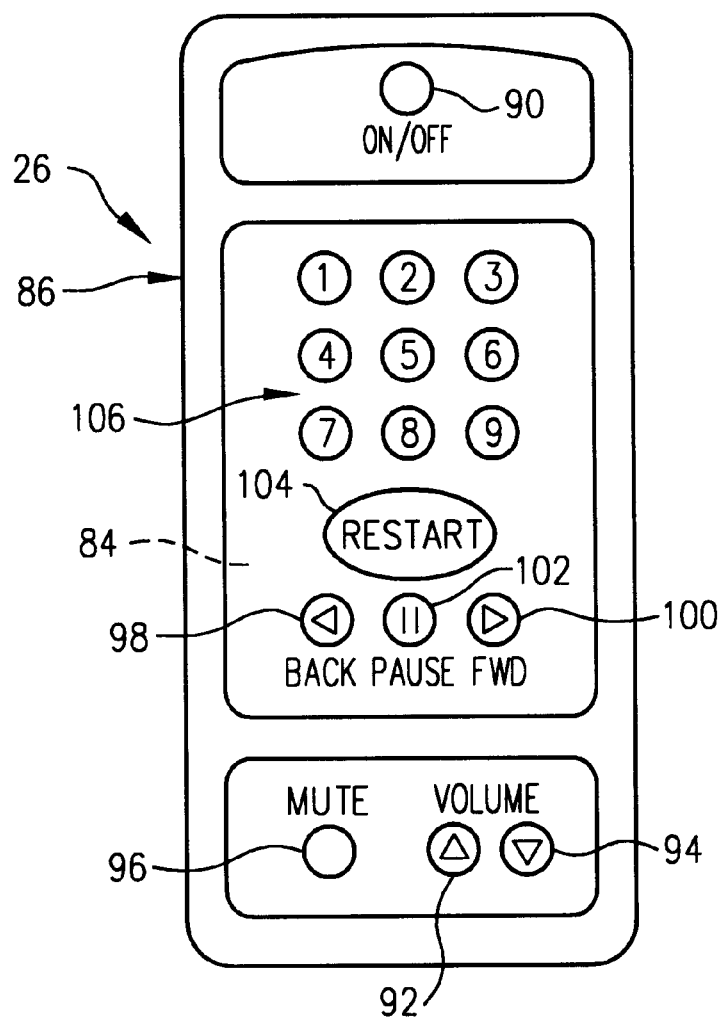
FIG. 3 is a plan view of a remote control which is an optional component of the FIG. 1 system.

Becoming ever more common are laser readable discs with multiple audio channels—for example, channels making information and instructions available in two different languages. If a disc of that character is available, the user of system 20 can select the language in which instructions and information are to be presented, one by moving actuator 83 of switch 82 to L or to R. The third, STEREO position can be selected when the user wants to listen to music from a conventional compact disc, for example Referring now to FIGS. 1 and 3, it was pointed out above that the remote control 26 of system 20 frees the user of the system from the location of integrated unit 24. This can, in many applications of the invention, be a feature of particular significance from the viewpoint of convenience, if not that of practicality. For example, this allows the user to access information stored on disc 22 at the location where the user is engaged in a task regarding which information is sought. This contrasts directly with the modus operandi of written and electronic manuals and the like which typically require that the user go to a specified fixed location to retrieve information.

Remote control 26 differs from a conventional electronic equipment remote control in that it need not be picked up to be operated but can be conveniently employed while located on a table, countertop, etc., thus requiring only one hand for operation. This feature is of considerable importance because those using a system of the character described herein may simultaneously be engaged in a task which makes it inconvenient, if not impractical, to use a conventional remote control requiring one hand to hold the device and the other to press its operating buttons.

Another important feature of remote control 26 is that the interior 84 of this unit is sealed. This keeps liquids, dust, and other foreign matter apt to be present in environments in which system 20 can advantageously be employed from penetrating to the interior of the remote control. Foreign matter can interfere with the operation of, if not actually damage, the internal remote control components.

Remote control 26 includes a casing 86 and a complement of controls for operating integrated unit 24. These controls duplicate those controls on the front panel 40 of integrated unit cabinet 34 which are employed while using system 20 in its learn while doing mode of operation.

The remote unit controls include: on-off switch 90; volume up and down buttons 92 and 94; mute button 96; back, forward, pause, and restart buttons 98, 100, 102, and 104; and buttons ① . . . ⑨ which collectively constitute a numerical keypad 106. These controls are preferably of the pushbutton type, with the actuation of each button causing remote control 26 to broadcast a distinctly coded operating signal to integrated unit 24. It is preferred that radio frequency (R-F) signals be employed. Signals in this frequency range have a relatively broad dispersion pattern. Therefore, the accuracy with which remote control 26 has to be aimed at the sensor 107 on the front panel 40 of integrated unit cabinet 34 to operate that unit is not particularly critical. This is a significant convenience to a user of system 20 who is engaged in another task while using the remote control and may furthermore be employing the remote control in a tabletop or comparable mode of operation with the remote control so oriented that the axis of propagation of the transmitted signal is not well aligned with the sensor (or receiver) 107 on the front panel of module 24.

The onboard integrated unit controls (or the remote control pushbuttons if a remote control is available) are employed by the user of system 20 to navigate through a hierarchial array of visual and audio/visual displays. To meet the needs of the new or less experienced user and to make a refresher available to more experienced system users, the hierarchial menu array may be headed by an introductory video explaining how to use system 20 in its learn while doing mode.

Referring still to the drawing, the chart 108 in FIG. 4 depicts one representative course that may be navigated to retrieve information on a selected subject from compact disc 22. In this representative example, it is assumed that four lessons (or presentations of information) 110a . . . 110d on a particular subject are available to the system user. Lessons 110a . . . 110d are arranged in a hierarchy 112 having four levels 114a . . . 114d. Each of the first three levels 114a . . . 114c also includes a visual presentation which tests the user of system 20 on the user's understanding and/or assimilation of information presented in the companion lesson 110a . . . 110c. The fourth lesson 110d is presented as a review of the first three lessons in the representative, FIG. 4 scenario.

It is to be understood that there will typically be more than one question available to the system user at each of the hierarchial levels 114a, 114b, and 114c. The choices available at each of these levels are preferably limited to nine and numbered so that, at each of the three levels, a choice of questions can be made by pressing a single, correspondingly numbered one of the buttons ① through ⑨ of the numerical keypad 52 on the front panel 40 of integrated unit cabinet 34.

Appearing with the selected question is a set of answers to that question, only one of which is correct. With the question and answers brought up on screen 30, the system user again presses a button on numerical keypad 52 to select his or her answer. Multiple choice questions are shown in the representative navigation chart 108 of FIG. 4. True and false questions may equally well be presented, the system user being instructed to use button ① on keypad 52 to answer a question as true and to use button ② to answer the question false.

If the system user answers the posed question(s) correctly, the instruction set encoded on data storage disc 22 automatically brings up the next lesson in the series available to the user. For example, if the single question one on lesson one at the first level 114a in hierarchy 112 is answered correctly, the video demonstration constituting lesson two is automatically played as indicated by arrow 118 in FIG. 4. If, instead, the system user incorrectly answers question one, the video demonstration constituting lesson one is repeated as indicated by arrow 120.

System 20 may be designed to measure the system user's level of understanding in a more sophisticated manner than merely determining whether the user has answered a question correctly or incorrectly. For example, reference character 116 identifies an answer block for lesson 2. The system user has three answers to choose among. The selection of answer 2 reflects a less than satisfactory understanding of lesson 2. Consequently, if the system user selects this answer, lesson 2 is automatically repeated as indicated by arrow 116-2. The selection of answer 3 reflects a satisfactory level of understanding. Consequently, if this answer is selected, system 20 automatically advances to lesson 3 as indicated by arrow 116-3. The selection of answer 1 reflects a superior level of understanding that makes lesson 3 unnecessary. Consequently, if this answer to lesson 2 is selected, the system automatically advances to lesson 4 as indicated by arrow 116-1.

It is to be understood, in conjunction with the foregoing description of navigational chart 108, that a number of the arrows indicating automatic and user-selected steps through the illustrated hierarchy have been omitted. Omitted arrows include, for example, those depicting the sequencing automatically effected upon the system user selecting an answer to the question on lesson 3 from answer block 117. It is to be understood that the foregoing and comparable omissions have been made for the sake of brevity and to reduce confusion in the interpretation of FIG. 4 and are in no way intended to limit the scope of patent protection as defined in the appended claims.

From any presentation or step in the hierarchy of chart 108 except for lesson four at lowest level 114d, the system user can proceed at his or her discretion to the next lower step, be it a lesson or question, by pressing the forward (FWD) button 122 on the front panel 40 of integrated unit cabinet 34. The representative displays brought up at various locations in hierarchy 112 by pressing button 122 are indicated in FIG. 4 by FWD arrows F.

Conversely, by pressing the BACK button 124 on panel 40, the system user can, at any time, back up one step through hierarchy 112. This is shown by arrows B in FIG. 4.

The RESTART button 126 on panel 40 further increases the versatility of system 20. As shown by the arrows labeled R in FIG. 4, the user of system 20 can return from any step in an available sequence to the first step (in this case lesson one) by pressing button 126 a single time.

PAUSE button 128 allows the system user to interrupt the learn while doing operation of system 20. Operation resumes at the point of interruption when button 128 is pressed a second time.

As discussed above, the just-described controls employed by the user of system 20 for navigating through a sequence such as that shown in FIG. 4 are duplicated on remote control 26. Consequently, if a remote control of the described character is available, navigation through chart 108 as rust discussed may also be accomplished by employing the remote control. This has the advantage of freeing the system user from integrated unit 24.

Conventional disc player controls—a second pause button 129a, a reverse button 129b, a forward button 129c, and a stop button 129d—are also preferably included in the front panel complement of integrated unit controls.

Described above is a remote control 26 of the radio frequency type. There are applications of the present invention in which a remote control of the infrared type may instead prove advantageous because the orientation of an infrared remote relative to the remote control receiver 107 of integrated unit 24 is even less critical than is the case with R-F remote control 26.

Figure 5:
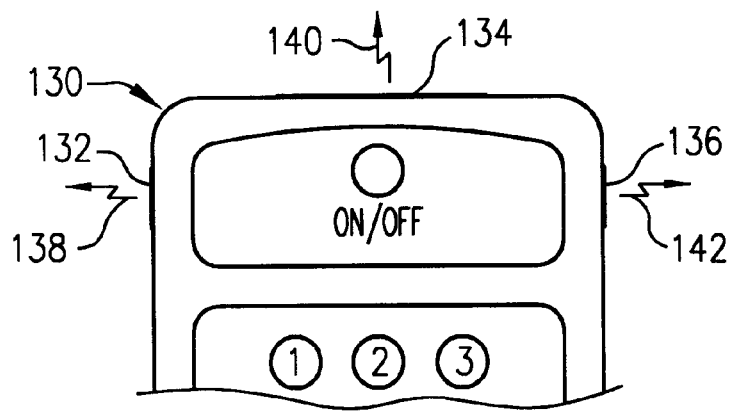
FIG. 5 is a fragmentary plan view of a second type of remote control which can optionally be employed in the teaching and training system of FIG. 1.

A remote control operating at infrared frequencies is shown in FIG. 5 and identified by reference character 130. Remote control 130 differs from its radio frequency counterpart 26 primarily in that it transmits infrared rather than R-F frequency signals. Also, it has windows 132, 134, and 136, generally transparent to energy in the infrared part of the electromagnetic spectrum, through which remote control-generated signals can pass as indicated in FIG. 5 by reference characters 138 . . . 142. Arrows 138 . . . 142 also demonstrate that a control signal can be transmitted to integrated unit signal receiver 107 irrespective of whether remote control 130 is oriented sideways or head-on with respect to the signal receiver.

Referring still to the drawing, FIG. 6 depicts an integrated unit or module 146 which differs from the integrated unit or module 24 discussed above in that it has a second, television viewing mode of operation in addition to the COACH mode of operation to which module 24 is restricted. Physically, module 146 differs from module 24 in that the onboard complement of controls includes a TV button 148, a COACH button 150, and conventional channel up and down buttons 152 and 154. Pressing COACH button 150 will result in the integrated unit operating system 54 being enabled to present on screen 30 and through speakers 66 and 68 information retrieved from laser readable disc 22. Similarly, pressing TV button 148 will result in operating system 54 being connected to an antenna, cable, VCR, or other source of a television signal and in visual and audio television signals being produced by CRT 28 and speakers 66 and 68.

The system 20 user can at any time and from any step switch from the COACH mode to the television watching mode of system 20 simply by pressing TV button 148 on module cabinet front panel 40 (or a complementary button—not shown—on a remote control of the character shown in FIGS. 4 and 6). When this is done, the COACH mode is "frozen." As a consequence, unless integrated unit 24 is in the interim turned off, the user is returned to the precise point where he or she exited the COACH mode when COACH button 150 is next pressed. This unique feature is of obvious convenience to a user who may wish to interrupt the COACH mode of operation to view television and then return to the lesson or other task at hand.

Figure 7:
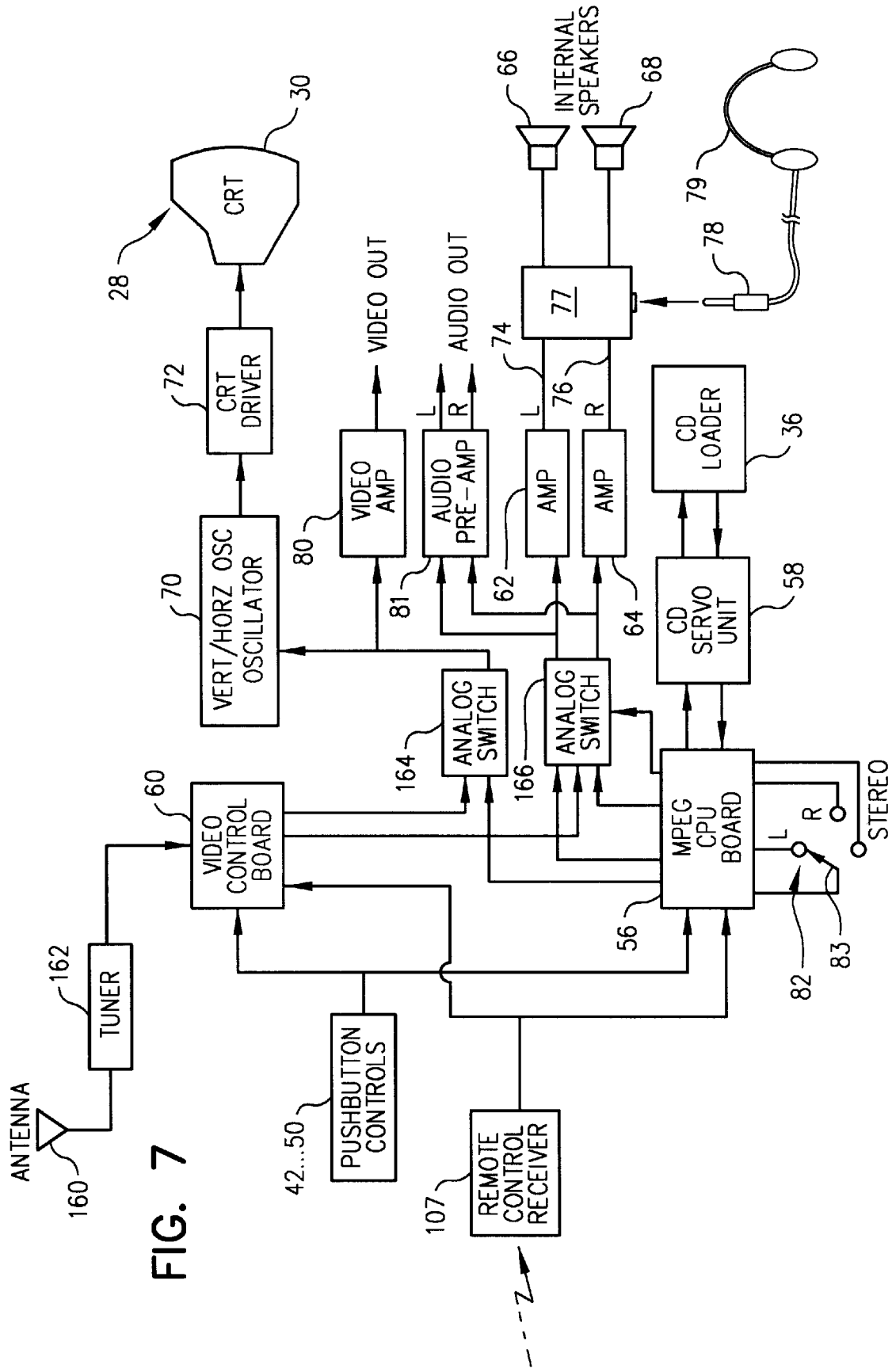
FIG. 7 depicts the operating system of the FIG. 7 module in a block diagram format.

Referring still to the drawing, FIG. 7 depicts, in block diagram form, the operating system 158 of integrated unit 146. This operating system differs from that operating system depicted in FIG. 2 and identified by reference character 54 primarily by the addition of the following components: a television signal source such as the illustrated antenna 160; a tuner 162; and a pair of analog switches 164 and 166.

Antenna 160 and tuner 162 function in conventional fashion to capture the television signal for a user-selected channel with that signal being transmitted to video control board 60. If a user has pressed TV button 148 to select the television viewing mode of operation, CPU 56 sets analog switches 164 and 166 to route the incoming signal to oscillator board 70, video amplifier 80, audio preamplifier 81, and left and right channel audio amplifiers 62 and 64. Conversely, if button 150 of integrated unit 146 is pressed to select the COACH mode of operation, CPU 56 sets analog switches 164 and 166 to instead route signals generated by retrieving and processing data coded onto laser readable disc 22 to the system components just discussed.

The invention may be embodied in many forms without departing from the spirit or essential characteristics of the invention. The present embodiments are therefore to be considered in all respects as illustrative and not restrictive. The scope of the invention is indicated by the appended claims rather than by the foregoing description, and all changes which come within the meaning and range of equivalency of the claims are therefore intended to be embraced therein.

What is claimed is:

1. An information retrieval and display system which can be employed in a learning mode to access information on a specified subject or to obtain coaching on the performance of a task at hand, said system comprising the combination of:

an encoded, laser readable disc;

a single integrated module which has: (a) a player for said encoded, laser readable disc; (b) a screen for displaying information read from said disc; (c) a set of dedicated onboard controls for controlling the operation of said disc player; and (d) a cabinet, said disc player and said screen being housed in said cabinet with a front panel looking in the same direction as said screen and said onboard controls all being on the front panel of said cabinet;

said encoded disc having stored thereon in digital form: (a) data constituting a set of lessons or information for coaching a user of the system in accomplishing a task; and (b) data comprising an instruction set which enables the user to retrieve said lessons or the information for accomplishing the task; and said onboard controls comprising controls for so controlling the operation of the disc player as to cause commands in said instruction set which are selected by the system user to be executed.

2. A system as defined in claim 1 in which said instruction set includes means which results in there being presented on said screen at the end of at least one lesson or presentation of information a query designed to elicit from said user a response indicative of the user's understanding of the presented lesson or information, said instruction set further including means responsive to an incorrect response to cause the lesson or information to be repeated and means responsive to a correct response which advances the operation to the next lesson or presentation of information.

3. A system as defined in claim 1 in which said module has an onboard control for switching the module to a mode of operation in which television can be viewed.

4. A system as defined in claim 3 in which said module has operating means operable, when operation is switched from said learning mode to said television viewing mode and then back to the learning mode, to cause operation of the module in the learning mode to resume from the point where operation in that mode was interrupted by the switch to operation of the module in the television viewing mode.

5. A system as defined in claim 1 in which said instruction set contains a user-retrievable command which enables a user to have a lesson or the information on a particular topic repeated.

6. A system as defined in claim 1 in which said instruction set has user-retrievable commands which enable a user to navigate directly from a presentation of a lesson or information on one topic to a presentation of a preceding or subsequent lesson or a presentation of information on a preceding or subsequent topic.

7. A system as defined in claim 1 in which said user-retrievable commands include at least one command which enables a user to navigate from one component of a lesson to another component of said lesson.

8. A system as defined in claim 1 in which said instruction set has a user-retrievable command which enables a user to return directly from a presentation of a lesson or information on a particular topic to the initial lesson in said set of lessons or to the initial presentation in a hierarchical array of presentations of information.

9. A system as defined in claim 1 wherein:
said disc is encoded with data representing said information or lessons in at least two different formats; and
said controls include a user-actuatable means for selecting the format in which said lessons or said information is displayed on said screen.

10. A system as defined in claim 1 wherein:
the data encoded on said disc represents at least one lesson which comprises a presentation of information followed by a set of multiple choice answers; and
said controls include user-actuatable means for selecting an answer and means automatically responsive to a level of understanding of the lesson reflected by the selected user to:
repeat the lesson, or advance to the next lesson in a set of lessons, or skip said lesson and advance to a subsequent lesson in the sequence.

11. An information retrieval and display system as defined in claim 1 which includes a remote control with controls duplicating those onboard controls provided to execute commands in said instruction set.

12. A system as defined in claim 11 in which the remote control has a radio frequency transmitter.

13. A system as defined in claim 11 in which the remote control has an infrared radiation transmitter.

14. A system as defined in claim 11 in which said remote control has means for switching said module to a mode of operation in which television can be viewed.

15. An information retrieval and display system which can be employed in a learning mode to access information on a specified subject or to obtain coaching on the performance of a task at hand, said system consisting exclusively of an encoded, laser readable disc and an integrated module;
said module comprising:

(a) a player for an encoded, laser readable disc which is operatively associated with said disc player; (b) a screen for displaying information read from said disc; and (c) onboard control means for controlling the operation of said disc player;

said encoded disc having stored thereon in digital form;
(a) data constituting a set of lessons or information for coaching a user of the system in accomplishing at least one step of said task; and (b) data comprising an instruction set which enables the user to retrieve said lesson or the information for accomplishing steps of the task on which information is available; and said onboard control means having means for so controlling the operation of the disc player as to cause commands in said instruction set which are selected by the system user to be executed.

16. A system as defined in claim 15 in which said module has an onboard control for switching the module to a mode of operation in which television can be viewed.

17. A system as defined in claim 16 in which said module has operating means operable, when operation is switched from said learning mode to said television viewing mode and then back to the learning mode, to cause operation of the module in the learning mode to resume from the point where operation in that mode was interrupted by the switch to operation of the module in the television viewing mode.

18. A system as defined in claim 15 in which said instruction set contains a user-retrievable command which enables a user to have a lesson or the information on a particular topic repeated.

19. A system as defined in claim 16 in which said instruction set has user-retrievable commands which enable a user to navigate directly from a presentation of a lesson or information on one topic to a presentation of a preceding or subsequent lesson or a presentation of information on a preceding or subsequent topic.

20. A system as defined in claim 19 in which said user-retrievable commands include at least one command which enables a user to navigate from one component of a lesson to another component of said lesson.

21. A system as defined in claim 15 in which said instruction set has a user-retrievable command which enables a user to return directly from a presentation of a lesson or information on a particular topic to the initial lesson in said set of lessons or to the initial presentation in a hierarchical array of presentations of information.

22. An information retrieval and display system which can be employed in a learning mode to access information on a specified subject or to obtain coaching on the performance of a task at hand, said system consisting exclusively of an encoded, laser readable disc, an integrated module, and a remote control:
said integrated module comprising: (a) a player for reading said encoded, laser readable disc; (b) a screen for displaying information read from said disc; and (c) user actuatable onboard control means for controlling the operation of said player; and said encoded disc having stored thereon in digital form:
(a) data constituting a set of lessons or information for coaching a user of the system in accomplishing at least one step of said task; and (b) data comprising an instruction set which enables the user to retrieve said lessons or the information for accomplishing the task on which information is available;

said onboard control means having means for so controlling the operation of the disc player as to cause commands in said instruction set which are selected by the system user to be executed; and said remote control having controls duplicating those user-actuatable onboard controls provided to execute commands in said instruction set.

23. A system as defined in claim 22 in which the remote control has a radio frequency transmitter.

24. A system as defined in claim 22 in which the remote control has an infrared radiation transmitter.

25. A system as defined in claim 22 in which said remote control has means for switching said module to a mode of operation in which television can be viewed.

26. An information retrieval and display system which can be employed in a learning mode to access information on a specified subject or to obtain coaching on the performance of a task at hand, said system comprising the combination of:

an encoded, laser readable disc;

a single integrated module which has: (a) a player for said encoded, laser readable disc; (b) a screen for displaying information read from said disc; (c) a set of dedicated onboard controls for controlling the operation of said disc player; and (d) a cabinet;

said disc player and said screen being housed in said cabinet with a front panel looking in the same direction as said screen and said onboard controls all being on the front panel of said cabinet;

said encoded disc having stored thereon in digital form; (a) data constituting a set of lessons or information for accomplishing a task; and (b) data comprising an instruction set which enables a user to retrieve said lessons or the information for accomplishing the task;

said onboard controls comprising controls for so controlling the operation of the disc player as to cause commands in said instruction set which are selected by the system user to be executed; and said instruction set including means which results in there being presented on said screen at the end of at least one lesson or presentation of information a query designed to elicit from said user a response indicative of the user's understanding of the presented lesson or information, said instruction set further including means responsive to an incorrect response to cause the lesson or information to be repeated and means responsive to a correct response which advances the operation to a subsequent lesson or presentation of information.

27. An information retrieval and display system which can be employed in a learning mode to access information on a specified subject or to obtain coaching on the performance of a task at hand, said system consisting exclusively of an encoded, laser disc and an integrated module;

said module comprising:
(a) a player for an encoded, laser readable disc which is operatively associated with said disc player; (b) a screen for displaying information read from said disc; (c) onboard controls for controlling the operation of said disc player;

said encoded disc having stored thereon in digital form; (a) data constituting a set of lessons or information for coaching a user of the system in accomplishing at least one step of said task; and (b) data comprising an instruction set which enables a user to retrieve said lessons or the information for accomplishing each of those steps of the task on which information is available; and said onboard controls comprising controls for so controlling the operation of the disc player as to cause commands in said instruction set which are selected by the system user to be executed; and said instruction set including means which results in there being presented on said screen at the end of at least one lesson or presentation of information a query designed to elicit from said user a response indicative of the user's understanding of the presented lesson or information, said instruction set further including means responsive to an incorrect response to cause the lesson or information to be repeated and means responsive to a correct response which advances the operation to a subsequent lesson or presentation of information.

28. A system as defined in claim 27 in which said module comprises a numerical keypad with actuator means employable on a one-to-one basis to select a response to said query.

* * * * *